Aug. 26, 1958     D. R. BRISTOL     2,848,895

RECORDING THERMOMETER

Filed June 21, 1954

INVENTOR.
Donald R. Bristol
BY Barnes, Seed & Secret
attys.

United States Patent Office 2,848,895
Patented Aug. 26, 1958

2,848,895

RECORDING THERMOMETER

Donald R. Bristol, Seattle, Wash., assignor to Ryan Recording Thermometer Company, Seattle, Wash., a corporation of Washington Application June 21, 1954, Serial No. 438,007

2 Claims. (Cl. 73—343.5)

This invention relates to improved means for adjusting the thermostatic elements in a recording thermometer such as that shown in United States Patent No. 1,989,856, issued on February 5, 1935. This type of thermometer is commonly used in railway refrigerator cars, refrigerated trucks and trailers, etc., in which perishable food products are transported in order to obtain an accurate record of the temperature maintained during the journey. The thermometer includes thermostatic elements in the form of spiral coils arranged in opposed relation so as to neutralize the vibrations imparted thereto during a journey, in combination with a temperature record sheet, and a stylus cooperating with the record sheet and controlled by the thermostatic elements.

The principal object of the invention is to provide improved means for adjusting the thermostatic elements relatively to each other and to the stylus, so as to insure the operation of the oppositely disposed thermostatic elements in unison, uniform transmission of the movements of said elements to the stylus, and accurate cooperation of the stylus with the recording sheet upon which the variations in temperature are recorded.

With yet additional objects and advantages in view which, with the foregoing, will appear and be understood in the course of the following description and claims, the invention consists in the novel construction and in the adaptation and combination of parts hereinafter described and claimed.

Figure 2:
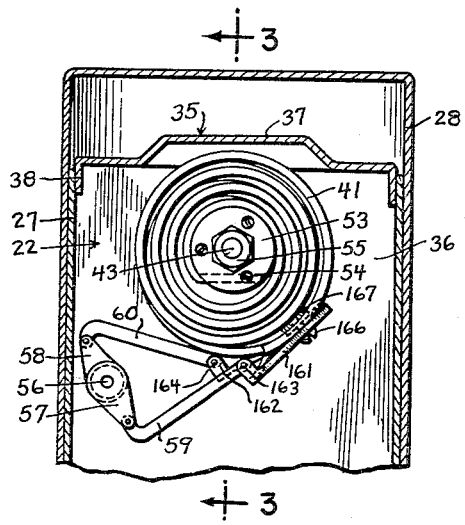
Fig. 2 is a partial central vertical sectional view of a recording thermometer showing the thermostatic elements in operative position and in front elevation.
Figure 3:
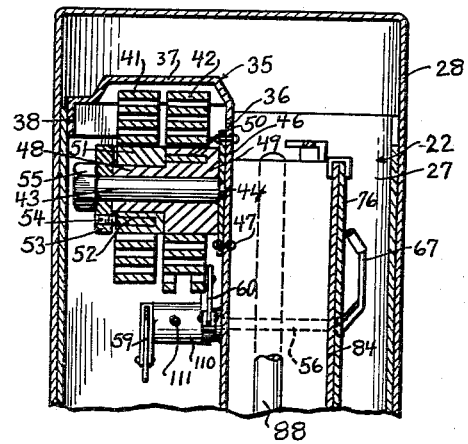
Fig. 3 is a partial vertical sectional view of the recording thermometer taken on line 3—3 of Fig. 2.
Figure 1:
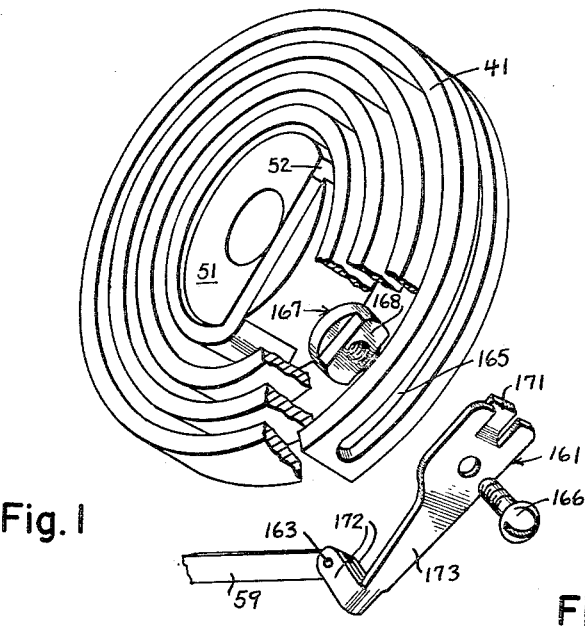
Figure 1 is an enlarged perspective view of one of my thermostatic elements with the parts of the adjusting means therefor shown in exploded relation.

Figs. 2 and 3 of the drawings correspond to Figs. 1 and 2, respectively, of the aforesaid U. S. Patent No. 1,989,856 and for ease of understanding the same identifying numerals have been applied to corresponding structural parts. Accordingly, 22 denotes a cup-shaped member having a cover 28 and centrally divided by a vertical partitioning wall 36 provided by a casing 35. The latter has a top wall 37 of semi-circular shape and at its curved edge this top wall has a downwardly turned flange 38 engaging the interior surface of the vertical annular wall 27 of the member 22.

Positioned within the casing 35 are thermostatic coils 41, 42, each of which is made up of bi-metallic material, one of which, preferably brass, has a high coefficient of expansion, and the other of which, preferably a nickel-steel alloy, has a coefficient of expansion which is practically negligible. For supporting the coils there is provided a post 43 which has its outer end threaded to receive a nut 55 and its inner end riveted in a base plate member 46, as at 44. This member 46 is in turn secured to the partition wall 36 by means of securing elements 47. Fitted upon the post 43 is a sleeve 48 which rests against the base plate member by an enlarged annular inner end portion 49. The outer reduced end portion of the sleeve receives a ring 51 and this ring and the enlarged end portion 49 are slotted at 52 and 50, respectively. Held in these slots by solder are the inner ends of the coils. The ring 51 rests against the shoulder provided by the enlarged portion 49 of the sleeve and its outer end terminates short of the outer end of the sleeve. A washer 53 is rotatably mounted on the post 43 so as to bear against the outer end of the sleeve, such washer being provided with adjusting screws 54 adapted to engage the adjacent end of the ring 51. The nut 55 bears against the washer when tightened and so it will be evident that by loosening the screw 54, the coil 41 may be rotatively adjusted relative to the other coil 42.

Mounted below and to one side of the coils 41, 42 is a rotatable shaft 56 which extends out through the partition 36 for adjustable connection with a stylus 67. This stylus works on a recording sheet 76 located in a magazine to a spool which is clutch-connected to a shaft 88. A platen 84 gives backing for the recording sheet when it is contacted by the stylus. The shaft 88 passes through the bottom of the cup member 22 for interconnection with a suitable clock mechanism designed to turn the shaft at a predetermined rate.

The shaft 56 is provided with a collar 110 having a set screw 111 and formed at its ends with a pair of diametrically opposed cranks 57, 58. These cranks are interconnected with the thermostatic coils 41, 42 by links 59, 60 and extensions 161, 162, respectively, which have pin connections with one another, the pins between the links and the extensions being denoted 163, 164. Both of the thermostatic coils 41, 42 are substantially identical and it will be noted from Fig. 1 that the outer end portions thereof are longitudinally slotted at 165. The slots 165, as will be explained shortly, are provided for adjustment purposes and hence their length is of no particular significance other than of being long enough for the desired range of adjustment. In production it has been found convenient to continue each slot 165 for a half circle. For the extreme accuracy which my invention achieves and for ease of adjustment it is very important that the radius of curvature of the slotted end portion of each coil with reference to the longitudinal axis of the post 43 be made constant at a given calibration temperature desired so that a rigid connection between the extensions 161, 162 and the coils will give a respective constant distance between the longitudinal axis of the post 43 and the pin 163, and this imaginary link together with the points along the slots 165 of the coils the extensions are rigidly connected as by screws 166 and nuts 167. It can thus be seen that coil 41 and extension 161 may together be considered as a single link having an effective length equal to the distance between the axis of the post 43 and the pin 163, and this imaginary link together with the link 59 and crank 57 give a three bar linkage. In like manner the coil 42 and extension 162 can be considered as a single component of a three bar linkage having a link 60 and crank 58 as its other two components. If both of these three bar linkages were identical in length, the cranks 57, 58 would be subjected to the same turning movements by a change in temperature, assuming, of course, that the lengths of coil between the inner ends of the thermostatic coils and the connecting points of the extensions 161, 162 with the coils are such that they have equal expansion rates and that the components of the linkages were initially set with the same angular relationship with one another. This first assumption is taken care of by way of the fact that the length of each coil between its inner end and its connecting point with the respective extension can be accurately adjusted by the screw 166 and slot 165 arrangement. However, the second assumption re the angular relationship of the components of the linkages is not true in the present instance as will be apparent from an examination of Fig. 2. For example, it will be noted that the angle between the crank 58 and link 60 is less than the angle between the crank 57 and link 59. Accordingly, the parts of the linkages are so formed that the pin 164 is always slightly closer to the axis of the post 43 than is the pin 163, and this compensates for the variance in the angles between respective components of the linkages.

Figure 5:
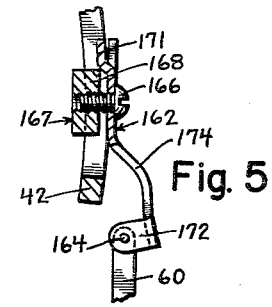
Fig. 5 is a sectional view taken on line 5—5 of Fig. 4.
Figure 4:
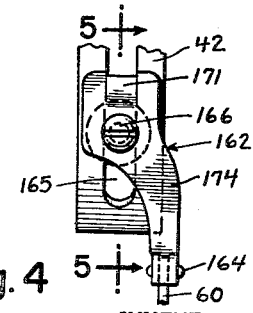
Fig. 4 is an enlarged fragmentary plan view showing the adjusting means for the right-hand of the thermostatic elements as viewed in Fig. 3, the adjusting means illustrated in Fig. 1 being for the left-hand of the thermostatic elements as viewed in Fig. 3.

It is important that the extensions 161, 162 be held securely against movements relative to the coils after they have been adjusted, and accordingly, the nuts 167 are formed with reduced flat-sided heads 168 corresponding in width to that of the grooves 165 so as to nest therein and thereby be restrained against rotation. Turning of the extensions about the screws 166 is prevented by offset flat-sided tongues 171 which mate with the grooves 165 in similar manner to the nut heads 168. From Fig. 5 is can be noted that the tongues 171 are drawn against the nuts 168 as the screws 166 are tightened and may be slightly deformed to load the screws. Both extensions provide a pair of spaced parallel ears 172 serving as gudgeons for the pins 163, 164. These ears bend at right angles to and from the free ends of tapered body portions 173, 174 and it is in these portions that the extensions differ. The portion 173 of extension 161 is flat whereas the portion 174 of extension 162 curves out of the plane of the rest of the extension as seen in Fig. 5 and also curves to one side of the related coil 42 so that the link 60 can clear the side of the coil as best shown in Fig. 3.

The adjustment of the device will now be explained. To coordinate the coils and their linkages with the stylus 67, the set screw 111 on the collar 110 is loosened and the coils, after being positioned around the post 43, are turned with respect thereto until the crank 58 is brought to bear against the wall 27. The stylus and shaft 56 are then turned with respect to the collar to bring the stylus point at the upper end of the recording sheet 76 and the set screw 111 is tightened. As a second adjustment step the extensions 161, 162 are adjusted along the slots 165 in the coils by use of the screws 166 to give the stylus the correct amount of movement with regard to the scale of the recording sheet for a given temperature change. Following this step the coils 41, 42 are turned with respect to the post 43 until the stylus reads on the ambient temperature and the nut 55 is tightened thus completing the coordination of the coils, their linkages, and the stylus with the recording sheet. The final adjusting step is performed by turning the coil 41 with respect to the other coil 42 and the post 43 to eliminate any lag in the system and then the screws 54 are tightened.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a recording thermometer, a pair of thermostatic coils having their inner ends fixed with respect to a given common axis central of the coils, each of said coils having an outer end portion which has a constant radius of curvature with reference to said axis at a given calibration temperature and which is formed with a longitudinally extending elongated slot, a pair of cranks of equal length journaled for unitary rotation about an axis parallel to said common axis, a pair of links of equal length pivotally connected at one of their ends to respective ends of said cranks, and respective means for pivotally and adjustably connecting the other ends of said links to said outer end portions of the coils at any selected position along the length of said portions, each said means comprising a member pivotally connected to the respective said link and having a hole therethrough, a screw passing through said hole and the respective slot, and a nut on said screw extending into the slot by a reduced head having diametrically opposite flat side edge portions arranged and adapted to be restrained from turning and from shifting sideways in the slot by the side walls thereof whereby said member is adjustably connected to the slotted portion of the respective coil.

2. The structure of claim 1 in which each of said members is formed with an offset tongue which extends therefrom into said slot of the respective coil, has a width substantially that of the slot, and is arranged to bear against the respective said nut when the corresponding screw is tightened at a selected point along the length of the slot.

References Cited in the file of this patent

UNITED STATES PATENTS

| | | |
|---|---|---|
| 1,752,362 | Barstow | Apr. 1, 1930 |
| 1,989,856 | Frantz | Feb. 5, 1935 |
| 2,287,494 | McCabe | June 23, 1942 |
| 2,334,969 | Thut | Nov. 23, 1943 |

FOREIGN PATENTS

| | | |
|---|---|---|
| 636,568 | Germany | Oct. 14, 1936 |